US007131364B2

(12) United States Patent
Brazell

(10) Patent No.: US 7,131,364 B2
(45) Date of Patent: Nov. 7, 2006

(54) COLLAPSIBLE STAND FOR A BENCH-TOP POWER TOOL

(75) Inventor: Kenneth Brazell, Piedmont, SC (US)

(73) Assignee: Eastway Fair Company, Ltd. (VG)

( * ) Notice: Subject to any disclaimer, the term of this patent is extended or adjusted under 35 U.S.C. 154(b) by 64 days.

(21) Appl. No.: 10/649,220

(22) Filed: Aug. 25, 2003

(65) Prior Publication Data

US 2005/0045781 A1 Mar. 3, 2005

(51) Int. Cl.
*B25H 1/04* (2006.01)
*F16M 11/16* (2006.01)
*F16M 11/00* (2006.01)

(52) U.S. Cl. ....................... 83/477.2; 83/859; 108/118; 108/159; 144/286.1; 248/188.6; 248/432; 248/436; 248/676

(58) Field of Classification Search .............. 83/477.2, 83/859; 108/115, 118, 159, 117, 120, 131, 108/132; 144/286.1, 286.5, 287; 248/188.6, 248/432, 436, 440, 163.1, 164, 166, 440.1, 248/637, 676, 677; 451/361
See application file for complete search history.

(56) References Cited

U.S. PATENT DOCUMENTS 1,295,194 A * 2/1919 Parelius .................. 108/159 X
1,807,916 A 6/1931 Jones
2,691,410 A 10/1954 Boucher
3,124,387 A 3/1964 Maclaren
3,136,272 A 6/1964 Sprigman
3,259,426 A * 7/1966 Shaw et al. ............. 108/115 X
4,231,557 A 11/1980 Blachly et al.
RE31,641 E 8/1984 Derus
4,776,545 A 10/1988 Miyamoto
4,860,807 A 8/1989 Vacchiano
4,969,496 A 11/1990 Romans
5,067,535 A 11/1991 Wolff
5,351,730 A 10/1994 Lewellen et al.
5,383,977 A 1/1995 Pearce
5,462,102 A 10/1995 Searfoss
5,479,840 A 1/1996 Hilliard et al.
5,542,639 A 8/1996 Wixey et al.
5,592,981 A 1/1997 Derecktor
5,645,259 A 7/1997 Chen
5,676,124 A 10/1997 Lee
5,778,953 A 7/1998 Braddock
5,884,681 A * 3/1999 Nickles ............... 144/286.1 X
5,893,605 A 4/1999 Chang
5,984,406 A 11/1999 Lee
6,125,769 A 10/2000 Tsai et al.
6,155,318 A 12/2000 Underwood
6,158,361 A 12/2000 Zheng et al.

(Continued)

OTHER PUBLICATIONS

DeWalt 10 in. Table Saw with Stand at sears.com, "DeWalt 10 in. Table Saw with Stand," 5 pages.

*Primary Examiner*—Clark F. Dexter
(74) *Attorney, Agent, or Firm*—Brinks Hofer Gilson & Lione; G. Peter Nichols

(57) ABSTRACT

The present invention discloses a collapsible stand for a bench-top power tool, and a portable power tool therefore. The stand includes a plurality of legs spaced about a central axis and pivotally interconnected by a plurality of cross members. Each leg has an upper end for supporting the power tool and a lower end for contacting an underlying support surface in an expanded position of the stand. The stand may be collapsed wherein the legs and cross members collectively converge toward the central axis as the legs and cross members each translate towards an orientation that is parallel to the central axis.

8 Claims, 6 Drawing Sheets

U.S. PATENT DOCUMENTS 6,182,724 B1 2/2001 Chou et al.
6,182,935 B1 2/2001 Talesky
6,203,053 B1 3/2001 Sohrt et al.
6,234,089 B1 5/2001 Zheng et al.
6,240,987 B1 6/2001 Birkeland
6,322,138 B1 11/2001 Tang
6,345,829 B1 2/2002 Mueller
6,360,797 B1 3/2002 Brazell et al.
6,435,460 B1 8/2002 Van Cleave et al.
6,499,705 B1 12/2002 Tsai
6,505,565 B1 1/2003 Byung et al.
D471,287 S 3/2003 Sommerville et al.
6,565,165 B1 5/2003 Switkes
6,578,856 B1 6/2003 Kahle
6,595,096 B1 * 7/2003 Ceroll et al. .................. 83/473
6,607,015 B1 * 8/2003 Chen ....................... 144/286.1
2002/0124705 A1 9/2002 Ricker
2002/0170630 A1 11/2002 Thoman
2002/0179181 A1 12/2002 Murphy
2003/0097920 A1 5/2003 Ransom et al.
2004/0051009 A1 * 3/2004 Chen ....................... 248/163.1
2004/0084581 A1 * 5/2004 Chang ........................ 248/166
2004/0187666 A1 * 9/2004 Huang ..................... 083/477.2

* cited by examiner 12
18
20
16
14
30
48
72
90
28
86
78
92
34
82
10
76
70
26
24
94
22
32

COLLAPSIBLE STAND FOR A BENCH-TOP POWER TOOL

BACKGROUND OF THE INVENTION

1. Field of the Invention

The invention relates to collapsible stands, particularly to collapsible stands for bench-top power tools.

2. Background Art

The prior art teaches a variety of stands for supporting bench-top power tools. The prior art stands include various features for enhancing portability and mobility. For example, the prior art teaches collapsible stands that may be collapsed to a compact and generally planar arrangement for transporting the stand when not in use. Conventional bench-top power tool stands include features for supporting the power tool and securing the power tool thereto for sturdy support during operation of the power tool.

The prior art also teaches collapsible furniture wherein the structural members of the collapsible furniture converge toward a central axis, such that the furniture may be stored and transported in a collapsed, longitudinal bundle.

A goal of the present invention is to provide a collapsible stand for a bench-top power tool that is sufficiently compact, yet stable for supporting a bench-top power tool.

SUMMARY OF THE INVENTION

An aspect of the present invention is to provide a collapsible stand for a bench-top power tool. The stand comprises a plurality of legs spaced about a central axis of the stand. The legs each have an upper end adapted to support the power tool and a lower end for forming part of a foot for contacting an underlying support surface in an expanded position of the stand. The stand also includes cross members for interconnecting sequential pairs of legs. The stand is expandable to a position for supporting the power tool, and the stand is collapsible wherein the legs and cross members collectively collapse toward the central axis. As the legs and cross members collapse, each of the structural members translates towards an orientation parallel to the central axis.

Another aspect of the present invention is to provide a portable bench-top power tool for securing the stand thereto in a collapsed orientation of the stand, thereby facilitating transportability of the bench-top power tool and stand.

Another aspect of the present invention is wherein the stand provides a plurality of mounting configurations for mounting and supporting the bench-top power tool thereto.

The above aspects and other aspects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
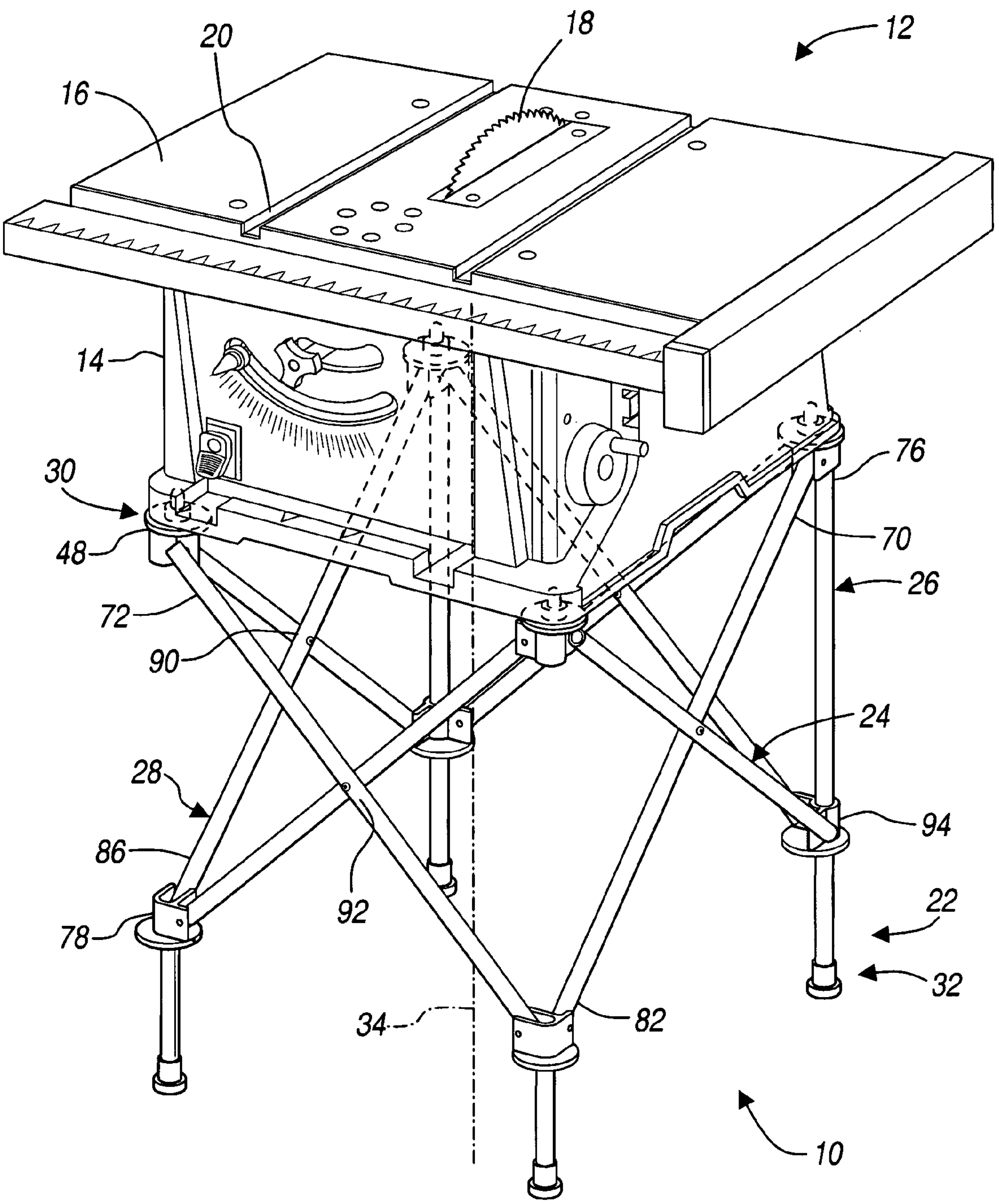
FIG. 1 is a perspective view of a collapsible stand for a bench-top power tool in accordance with the present invention, the collapsible stand is illustrated in an expanded orientation supporting the bench-top power tool.

Referring now to FIG. 1, a preferred embodiment of the collapsible stand is illustrated in accordance with the present invention and referenced generally by numeral 10. The collapsible stand 10 is provided for supporting a bench-top power tool, as illustrated. Specifically, the preferred embodiment collapsible stand is provided for supporting a portable table saw 12.

Table saws are useful power tools in various operations, such as woodworking and are typically provided either with fixed legs or without legs for installation on a bench stand. Table saws without fixed legs have greater portability to transport the table saw 12 to a desired work site. A conventional table saw 12 includes a saw base 14 having a motor and a spindle (not shown) oriented therein. A table top 16 is affixed to the saw base 14 for receiving and supporting a workpiece during operation of the table saw 12. A saw blade 18 is affixed to the spindle, which is driven by the motor and extends partially through an opening formed in the table top 16 for performing cutting operations and the like. The table saw 12 is similar to conventional table saws and includes such features that are well known in the art, such as longitudinal slots 20 formed in the table top for receiving a miter gauge; a mechanism for angular adjustment and depth of cut adjustment of the saw blade 18.

Although a table saw 12 is illustrated and described, the invention contemplates utilization of the collapsible stand 10 with any bench-top power tool, such as a miter saw, a router stand, a scroll saw, a planar, an oscillating spindle sander, or the like.

Figure 2:
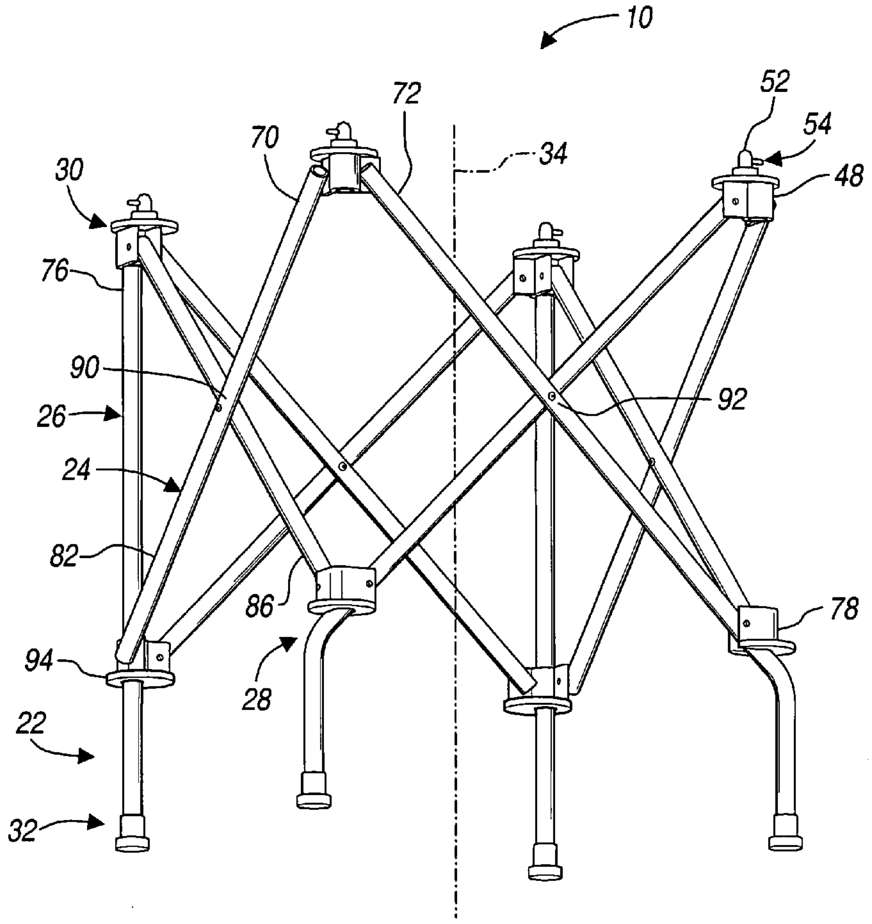
FIG. 2 is another perspective view of the collapsible stand of FIG. 1, also illustrated in an expanded position thereof.

Referring now to FIG. 2, the collapsible stand 10 is formed from a plurality of structural members including legs 22 and cross members 24. The cross members 24 are further defined as a plurality of pivotal links interconnecting the legs 22. The legs 22 include a pair of longitudinal legs 26 and a pair of inclined legs 28. Each leg 22 includes an upper end 30 for supporting and mounting the table saw 12 thereto. Each leg 22 includes a lower end 32 for forming part of a foot for contacting an underlying support surface in an expanded position of the stand. The legs 22 are spaced about a central axis 34 of the stand 10. The stand 10 is illustrated in the expanded position of FIG. 2 for supporting the table saw 12. The stand is also collapsible wherein the legs 22 and cross members 24 collectively converge toward the central axis 34. As the stand 10 is collapsed, the legs 22 and the cross members 24 each translate toward an orientation parallel to the central axis 34.

Figure 3:
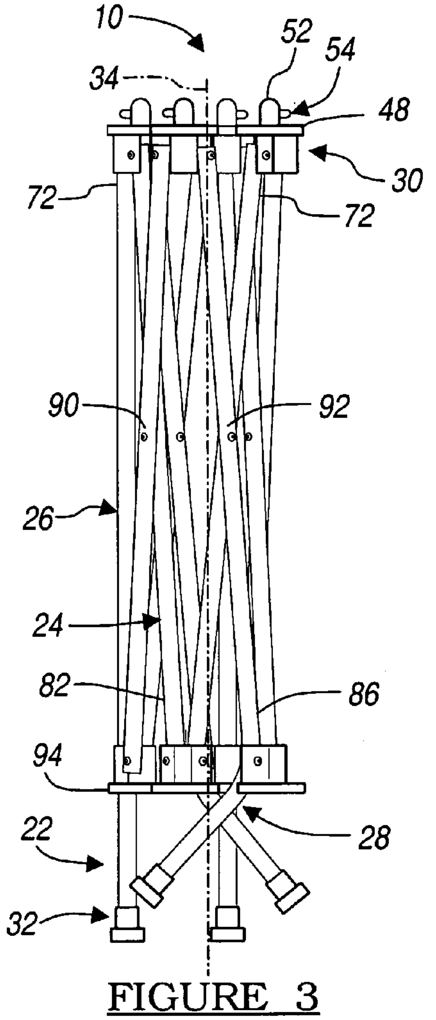
FIG. 3 is a side perspective view of the collapsible stand of FIG. 1, illustrated in a collapsed orientation thereof.

FIG. 3 illustrates the stand 10 in a collapsed orientation. The stand 10 is generally compact, as the structural members have all converged to a longitudinal bundle. The cross members 24 and the inclined legs 28 each translate to an orientation in the collapsed mode wherein each of these members has a relatively steep slope in comparison to the inclined orientation in the expanded mode of the stand 10. The inclined legs 28 and the cross members 24 of the preferred embodiment stand 10 are not parallel to the central axis 34 in the collapsed position. However, these inclined structural members have translated towards an orientation that is parallel to the central axis 34, thus increasing the slope of these members and thereby minimizing the lateral dimension thereof for providing a sufficiently compact collapsible stand.

Figure 2A:
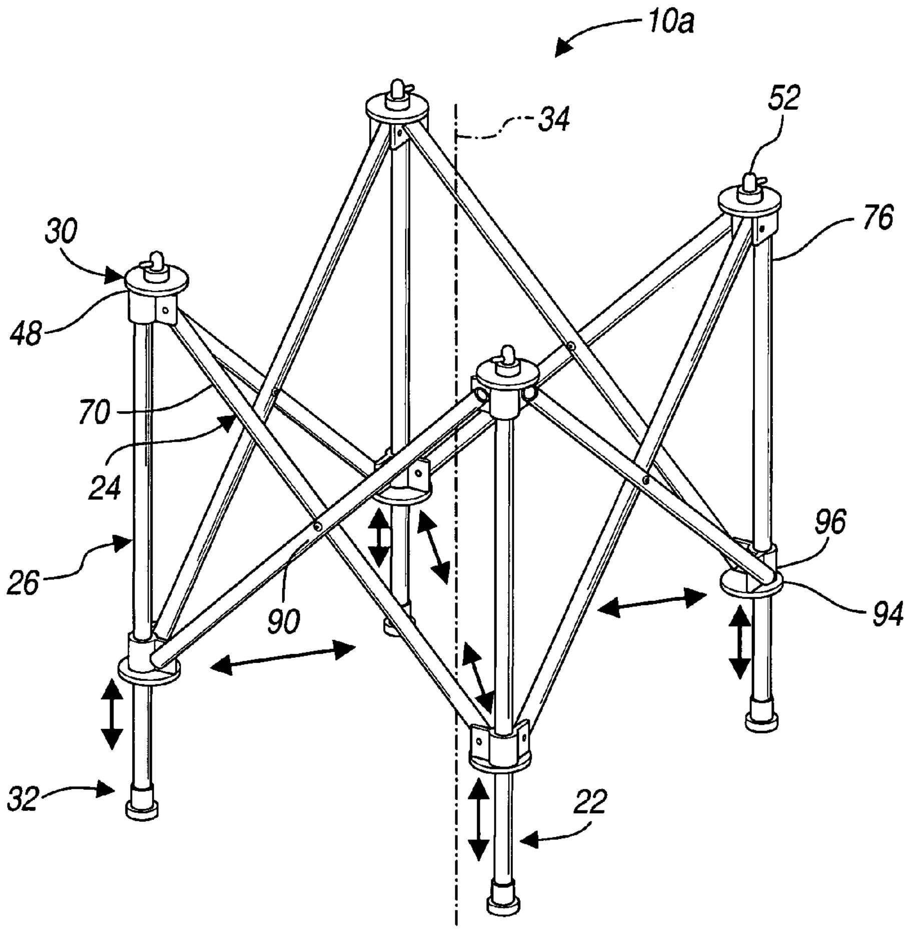
FIG. 2*a* is a perspective view of an alternative embodiment collapsible stand in accordance with the present invention, illustrated in an expanded position thereof.
Figure 2B:
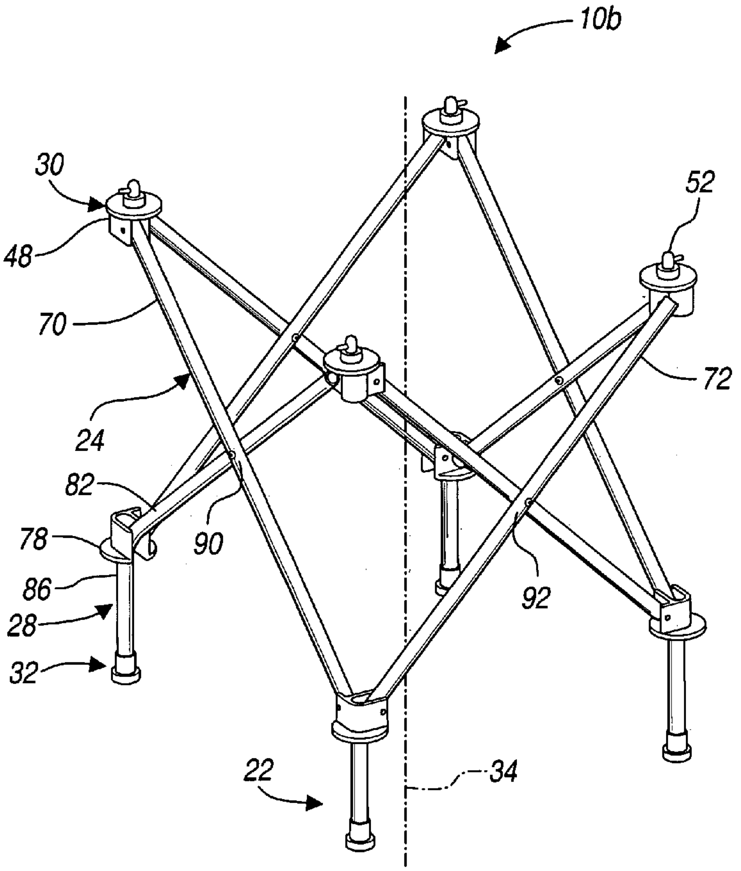
FIG. 2*b* is a perspective view of another alternative embodiment collapsible stand in accordance with the present invention, illustrated in an expanded position thereof.

The preferred embodiment collapsible stand 10 includes two longitudinal legs 22, two inclined legs 28, and six cross members 24. However, any number and combination of legs is contemplated within the scope of the present invention. For example, as illustrated in FIG. 2*a*, an alternative embodiment of collapsible stand 10*a* includes four longitudinal legs 22 with two cross members 24 interconnecting each sequential pair of longitudinal legs 22, thus totaling eight cross members 24. For example, another alternative embodiment of collapsible stand 10*b* includes four inclined legs 28 as illustrated in FIG. 2*b*. The inclined legs 28 serve as both one of the legs 22 and as a cross member, and therefore a collapsible stand having four inclined legs 28 would only require four cross members 24.

Figure 4:
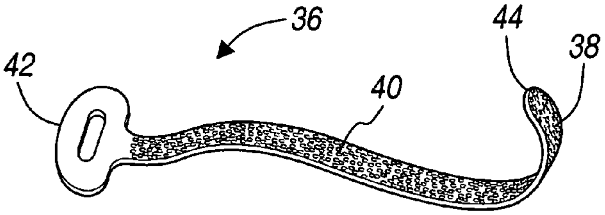
FIG. 4 is a top plan view of a strap for utilization with the stand of the present invention.

Referring now to FIG. 4, a strap 36 is illustrated for securing the stand 10 in a collapsed orientation. Specifically, the strap 36 is formed of a hook-and-loop material having a hook surface 38 and a loop surface 40. The strap 36 has a first end 42 which may be affixed to one of the legs 22 or cross members 24 of the stand 10. The first end 42 includes an opening therein, which may be fastened to one of the legs 22 or cross members 24; may receive one of the tubular structural members therein; or a second distal end 44 of the strap 36 may wrap around one of the legs 22 or cross members 24 and through the opening in the first end 42 for securing the strap first end 42 thereto. The strap 36 is utilized such that the second end 44 is wrapped laterally about the collapsed legs 22 and cross members 24 and the second end 44 is affixed to the first end 42 by hook-and-loop engagement, thus securing the stand 10 within the strap 36 and maintaining it in the collapsed orientation for portability and transportation.

Figure 5:
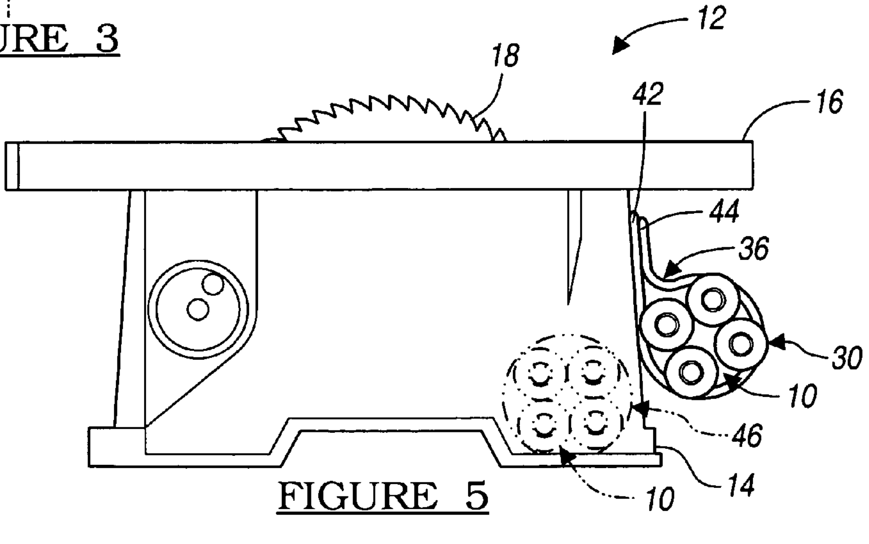
FIG. 5 is a side elevational view of the bench-top power tool of FIG. 1.

Referring now to FIG. 5, the table saw 12 is illustrated in a side elevational view thereof. The strap 36 is illustrated affixed to the saw base 14, thereby mounting the collapsed stand 10 to the portable saw 12 for unitary transport of the portable table saw assembly comprised of the portable table saw 12 and the collapsible stand 10. Alternatively, as illustrated in phantom, the portable table saw 12 may include a nest 46 formed therein for retaining the collapsed stand 10. Preferably, the saw base 14 is formed by an injection molding process and the nest 46 may be provided as a pair of apertures formed through opposing sidewalls of the table saw for receiving the collapsed stand 10 therethrough. Of course, the apertures of the nest 46 avoid interference with the motor, a trunnion, or any other operational elements of the table saw 12 that are oriented within the saw base 14.

Figure 6:
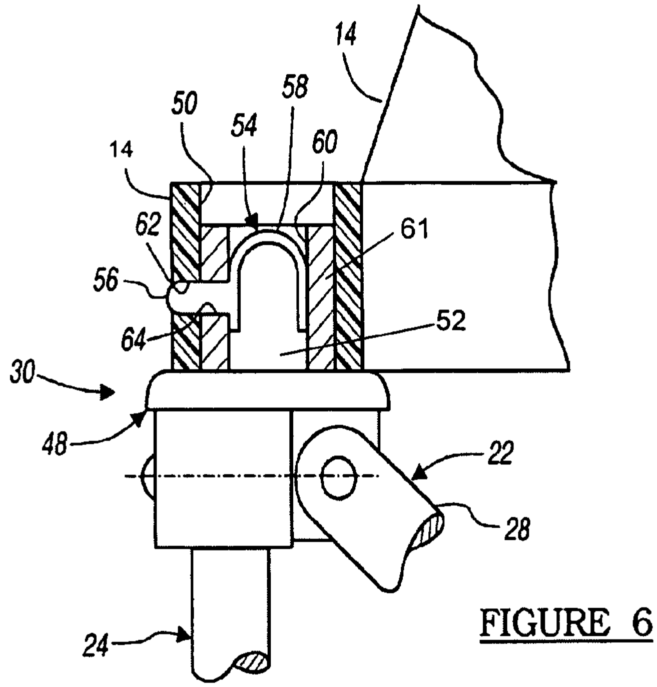
FIG. 6 is a partial section view of a corner of the saw base and corresponding stand leg according to the present invention.

Table saw 12 includes a first series of attachment configurations formed about a lower peripheral edge of the saw base 14. The collapsible stand includes a corresponding second series of attachment configurations. Referring now to FIG. 6, these features are described with reference to a partial section view of one of the corners of the saw base 14 and a corresponding leg upper end 30. The leg upper end 30 includes a pivot block 48 pivotally connected to the cross member 24 and operably connected to the leg 22. The leg 22 that is connected to the specific pivot block 30 is an inclined leg 28 and therefore is pivotally connected thereto. The saw base 14 includes a series of bores 50 for receiving a corresponding projection 52 extending from each pivot block 48. The bore 50 may be formed to a blind depth upwardly within the saw base 14 or may be formed therethrough and utilized for either mounting the saw base 14 to the collapsible stand 10 or for fastening the saw base 14 to an alternative support fixture.

In order to maintain the engagement of the pivot block projection 52 within the bore 50, the stand 10 includes a plurality of locking mechanisms 54 for locking the saw base 14 to the stand 10 and retaining it thereto for providing a stable, locked connection during cutting operations of the table saw 12. The locking mechanism is illustrated as a pin 56 connected to a wave spring 58 that is housed within a central bore 60 formed through the pivot block projection 52. The pin 56 is urged by the wave spring to extend through an aligned pair of transverse apertures 62, 64 formed through the saw base 14 and the pivot block projection receiving member 61, respectively.

The locking mechanism 54 operates so that as the saw base bores 50 are slid over the pivot block projections 52, each saw base bore 50 urges the corresponding pin 56 inwardly until the saw base transverse apertures 62 align with the tranverse aperture 64 of the pivot block projection receiving member 61, thus permitting the wave spring 58 to urge the pin 56 outwardly and through the saw base transverse aperture 62, thus locking the respective saw base corner to the pivot block 48. To unlock the locking mechanism 54, the user merely presses the pin 56 inward and removes the saw base 14 from the pivot block projection 52.

Figure 7:
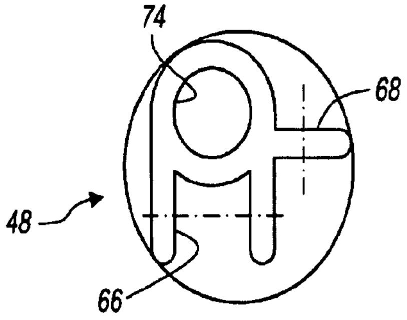
FIG. 7 is a bottom plan view of a pivot block of the collapsible stand of FIG. 1.

Referring now to FIGS. 2 and 6–8, the connection of the legs 22 and the cross members 24 is discussed in greater detail. Referring specifically to FIG. 7, the pivot block 48 includes two pivot mounts 66, 68 for pivotally mounting a sequential pair of link upper ends thereto. For example, the pivot mounts 66, 68 may be pivotally connected to a sequential pair of cross member upper ends 70, or the pivot mounts 66, 68 may be connected to one cross member upper end 70 at an upper end 72 of one of the inclined legs 28. Pivot block 48 also includes a pocket 74 formed therein. When the pivot block 48 is pivotally connected to a pair of cross member upper ends 70, the pocket 74 receives an upper end 76 of a longitudinal leg 26.

Figure 8:
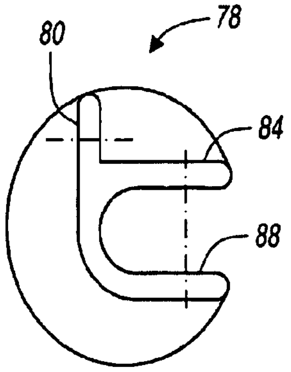
FIG. 8 is a top plan view of another pivot block of the collapsible stand of FIG. 1.

Referring now to FIG. 8, a lower pivot block 78 is illustrated for pivotally connecting one of the cross members 24 and one of the inclined legs 28. The lower pivot block 78 includes a pivot mount 80 for pivotal connection with a lower end 82 of a cross member 24. The lower pivot block 78 also includes a pivot mount 84 for pivotal connection with a lower end 86 of one of the inclined legs 28. A slot 88 is formed through the lower pivot block 78 aligned with the pivot mount 84 so that the inclined leg 28 may pass through the lower pivot block 78 and has pivotal connection therewith for forming the foot at the leg lower end 32.

Referring again to FIG. 2, each cross member 24 is pivotally connected at an intermediate region 90 thereof to the intermediate region 90 of an adjacent cross member 24. The pair of inclined legs 28 are pivotally connected to one another at respective intermediate regions 92 thereof. Due to the pivotal interconnection of all sequential link upper ends 70 or 72, adjacent link intermediate regions 90 or 92, and sequential link lower ends 82 or 86, the stand 10 is defined as a linkage assembly providing uniform expansion and contraction of the legs 22 and cross members 24 about the central axis 34.

Due to this uniform expansion and contraction, the lower pivot blocks that are aligned with the longitudinal legs 26 are further defined as slider blocks 94. A top plan view of a slider block 94 is similar to the bottom plan view of the pivot block 48 illustrated in FIG. 7. The slider block 94 includes a pair of pivot mounts 66, 68 for pivotal connection with a pair of sequential cross member lower ends 82. Further, the slider block 94 includes a through bore aligned with the recess 74 for slidably receiving longitudinal leg 26 therein. Thus, as the collapsible stand is collapsed from the orientation illustrated in FIG. 2 to the orientation illustrated in FIG. 3, the slider block 94 may slide longitudinally along the longitudinal leg 26 toward the leg lower end 32, and as the stand 10 is expanded, the slider block 94 may slide longitudinally along the longitudinal leg 26 toward the leg upper end 30.

Referring to FIG. 2*a*, the expansion of one of the collapsible stands 10, 10*a* having longitudinal legs 26 may be limited by stop blocks 96, which are each affixed to one of the longitudinal legs 26. As the collapsible stand 10*a* expands, the slider blocks 94 each contact a stop block 96. The stop blocks 96 each include an adjustment screw (not shown) permitting the user to adjust the orientation along the respective longitudinal leg 26. The stop blocks 26 limit the expansion of the collapsible stand 10*a* to an orientation wherein the projections 52 align with the arrangement of bores 50 in the table saw 12. The adjustability of the stop blocks 96 permits the stand to be adjusted for various tools having various bore arrangements. Although only one stop block 96 is required to limit expansion, a plurality of stop blocks 96 enhances stability for supporting the power tool.

In summary, the present invention provides a collapsible stand 10 that may collapse into a longitudinal bundle as the structural members converge toward the central axis 34, thereby providing a low-weight and cost-effective portable stand for supporting the bench-top power tool.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A portable table saw assembly comprising:

a saw base having a series of bores formed therein and oriented about a lower peripheral edge;

a table top affixed atop the base, spaced apart from the base lower peripheral edge, for supporting a workpiece thereon;

a saw blade extending through an opening formed through the table top; and a collapsible stand for supporting the saw base in an expanded position thereof, the stand having:

a series of pivot blocks, each pivot block having a projection extending therefrom sized to be received within one of the series of saw base bores, and a series of links, each having an upper end pivotally connected to one of the series of pivot blocks, and each having an intermediate region and a lower end;

wherein each pivot block is pivotally connected to a pair of sequential link first ends, each link intermediate region is pivotally connected to the intermediate region of an adjacent link, and the lower ends of the links define feet for supporting the stand and the saw base, the links cooperating to collectively converge, each from an inclined orientation towards a central axis and towards an orientation near parallel to the central axis.

2. The portable table saw assembly of claim 1, further comprising a series of locking mechanisms, each cooperating with one of the series of saw base bores and the corresponding pivot block projection for maintaining the engagement therebetween.

3. The portable table saw assembly of claim 1, wherein the lower end of each link is operably connected to a sequential link lower end.

4. The portable table saw assembly of claim 3, wherein a pair of sequential link lower ends are pivotally connected to a common pivot block.

5. The portable table saw assembly of claim 1, wherein the stand further comprises a plurality of longitudinal legs, each longitudinal leg being affixed to a pivot block and each longitudinal leg being operably connected to a pair of sequential link lower ends.

6. The portable table saw assembly of claim 5, wherein the longitudinal legs are each generally parallel with one another in the expanded position of the stand and in the collapsed position of the stand.

7. The portable table saw assembly of claim 5, wherein the longitudinal legs are each generally parallel with one another in the expanded position of the stand and the legs are each generally parallel with one another and generally parallel with the links in the collapsed position of the stand.

8. The portable table saw assembly of claim 5, wherein the stand further comprises a plurality of slider blocks each slidingly engaged with one of the plurality of longitudinal legs and each pivotally connected to the corresponding pair of sequential link lower ends.

* * * * *